US011098650B2

United States Patent
Balike et al.

(10) Patent No.: US 11,098,650 B2
(45) Date of Patent: Aug. 24, 2021

(54) COMPRESSOR DIFFUSER WITH DIFFUSER PIPES HAVING AERO-DAMPERS

(71) Applicant: PRATT & WHITNEY CANADA CORP., Longueuil (CA)

(72) Inventors: Krishna Prasad Balike, Brampton (CA); Ignatius Theratil, Mississauga (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 197 days.

(21) Appl. No.: 16/391,627

(22) Filed: Apr. 23, 2019

(65) Prior Publication Data

US 2020/0049076 A1 Feb. 13, 2020

Related U.S. Application Data

(63) Continuation-in-part of application No. 16/100,473, filed on Aug. 10, 2018, now Pat. No. 10,823,196.
(Continued)

(51) Int. Cl.
*F02C 7/24* (2006.01)
*F02C 3/08* (2006.01)
(Continued)

(52) U.S. Cl.
CPC ............... *F02C 7/24* (2013.01); *F02C 3/08* (2013.01); *F04D 29/441* (2013.01);
(Continued)

(58) Field of Classification Search
CPC .... F02C 7/24; F02C 3/08; F04D 29/44; F04D 29/441; F04D 29/444; F04D 29/66;
(Continued)

(56) References Cited

U.S. PATENT DOCUMENTS 2,157,002 A   5/1939 Moss
3,706,510 A   12/1972 O'Connor
(Continued)

FOREIGN PATENT DOCUMENTS

DE  4126907 A1 * 3/1992 ........... F04D 29/462
GB  2424927      10/2006
WO  WO-2018015027 A1 * 1/2018 ......... F04D 29/4213

OTHER PUBLICATIONS

European Search Report issued for Application No. 19189674.5 dated Dec. 18, 2019.

*Primary Examiner* — Alain Chau
(74) *Attorney, Agent, or Firm* — Norton Rose Fulbright Canada LLP (57) ABSTRACT

There is disclosed a diffuser pipe assembly having: a plurality of diffuser pipes circumferentially distributed around the central axis and configured for diffusing a flow of compressed air received from an impeller, the diffuser pipes having a diffuser conduit for directing the flow of compressed air, the diffuser conduit curving between an inlet end and an outlet end along a conduit axis, the diffuser conduit having a baseline surface, a first subset of the diffuser pipes having aero-dampers protruding from the baseline surfaces of their diffuser conduits such that the diffuser pipes of the first subset have a natural vibration frequency different than a natural vibration frequency of at least a second subset of the diffuser pipes.

20 Claims, 6 Drawing Sheets

Related U.S. Application Data (60) Provisional application No. 62/818,296, filed on Mar. 14, 2019.

(51) Int. Cl.
  *F04D 29/66* (2006.01)
  *F04D 29/44* (2006.01)

(52) U.S. Cl.
  CPC ...... *F04D 29/668* (2013.01); *F05D 2240/128* (2013.01); *F05D 2250/52* (2013.01); *F05D 2250/70* (2013.01); *F05D 2250/73* (2013.01); *F05D 2260/96* (2013.01)

(58) Field of Classification Search
  CPC .. F04D 29/668; F04D 29/665; F05D 2260/96; F05D 2250/73
  See application file for complete search history.

(56) References Cited

U.S. PATENT DOCUMENTS

| | | | |
|---|---|---|---|
| 4,253,800 A * | 3/1981 | Segawa | F01D 5/10 415/119 |
| 4,349,314 A * | 9/1982 | Erwin | F04D 21/00 415/181 |
| 4,504,188 A | 3/1985 | Traver et al. | |
| 6,123,506 A | 9/2000 | Brand et al. | |
| 6,379,112 B1 | 4/2002 | Montgomery | |
| 6,540,481 B2 * | 4/2003 | Moussa | F04D 29/441 415/208.2 |
| 6,589,015 B1 | 7/2003 | Roberts et al. | |
| 7,845,900 B2 | 12/2010 | Roduner et al. | |
| 8,100,643 B2 * | 1/2012 | Leblanc | F04D 29/444 415/208.2 |
| 8,425,188 B2 | 4/2013 | Dovbush | |
| 9,234,526 B2 | 1/2016 | Zheng et al. | |
| 9,709,062 B2 | 7/2017 | Zheng et al. | |
| 9,848,745 B2 | 12/2017 | Hill et al. | |
| 9,874,223 B2 | 1/2018 | Theratil et al. | |
| 9,926,942 B2 | 3/2018 | Duong | |
| 10,273,973 B2 | 4/2019 | Zheng et al. | |
| 10,302,100 B2 | 5/2019 | Xu | |
| 10,465,708 B2 | 11/2019 | Clemen et al. | |
| 10,570,925 B2 | 2/2020 | Duong et al. | |
| 2006/0104809 A1 * | 5/2006 | Fish | F04D 29/441 415/208.3 |
| 2010/0104432 A1 | 4/2010 | Hasselqvist et al. | |
| 2010/0150709 A1 | 6/2010 | Roduner et al. | |
| 2011/0271654 A1 | 11/2011 | Siden | |
| 2011/0274537 A1 | 11/2011 | Duong et al. | |
| 2013/0000308 A1 | 1/2013 | Dovbush et al. | |
| 2014/0255181 A1 * | 9/2014 | Ress, Jr. | F02C 7/28 415/213.1 |
| 2014/0369814 A1 | 12/2014 | Theratil et al. | |
| 2016/0017796 A1 | 1/2016 | Xu | |
| 2016/0053684 A1 | 2/2016 | Labrecque et al. | |
| 2016/0091206 A1 | 3/2016 | Rathmann et al. | |
| 2016/0115971 A1 | 4/2016 | Duong | |
| 2017/0023014 A1 | 1/2017 | Clemen et al. | |
| 2017/0108003 A1 | 4/2017 | Rusch | |
| 2017/0114794 A1 | 4/2017 | Duong | |
| 2017/0114797 A1 | 4/2017 | Duong | |
| 2017/0175776 A1 | 6/2017 | Theratil et al. | |

* cited by examiner

COMPRESSOR DIFFUSER WITH DIFFUSER PIPES HAVING AERO-DAMPERS

RELATED APPLICATION

This application claims priority from U.S. provisional patent Application No. 62/818,296 filed Mar. 14, 2019 and is a continuation-in-part of U.S. application Ser. No. 16/100,473 filed Aug. 10, 2018, the entire content of which is incorporated by reference herein.

TECHNICAL FIELD

The application relates generally to gas turbine engine and, more particularly, to diffuser pipe assemblies of centrifugal compressors used in such engines.

BACKGROUND

Centrifugal compressors of gas turbine engines which employ diffuser pipes downstream of an impeller are known to be exposed to high stresses. Consequently, past attempts have been made to account for such stresses by designing the diffuser pipes in a manner that will make them stiffer and thus less likely to be affected by such stresses.

SUMMARY

In one aspect, there is provided a diffuser pipe assembly for a centrifugal compressor of a gas turbine engine defining a central axis extending longitudinally through the diffuser pipe assembly, the diffuser pipe assembly comprising: a plurality of diffuser pipes circumferentially distributed around the central axis and configured for diffusing a flow of compressed air received from an impeller, the diffuser pipes having a diffuser conduit for directing the flow of compressed air, the diffuser conduit curving between an inlet end and an outlet end along a conduit axis, the diffuser conduit having a baseline surface, a first subset of the diffuser pipes having aero-dampers protruding from the baseline surfaces of their diffuser conduits such that the diffuser pipes of the first subset have a natural vibration frequency different than a natural vibration frequency of at least a second subset of the diffuser pipes.

In another aspect, there is provided a gas turbine engine comprising a centrifugal compressor rotatable about a central axis and a combustor downstream of the centrifugal compressor relative to a flow of compressed air exiting the centrifugal compressor, the centrifugal compressor including an impeller and a diffuser pipe assembly downstream of the impeller, the diffuser pipes having diffuser conduits for circulating the flow of compressed air, the diffuser pipe assembly configured for redirecting the flow of compressed air from a radial direction to an axial direction relative to the central axis, the diffuser pipe assembly including diffuser pipes circumferentially distributed around the central axis, the diffuser pipes defining diffuser conduits fluidly connected to the impeller and to the combustor, and a first subset of the diffuser pipes having aero-dampers within the diffuser conduits such that the diffuser pipes of the first subset have a natural vibration frequency different than a natural vibration frequency of at least a second subset of the diffuser pipes.

In yet another aspect, there is provided a method of operating a centrifugal compressor of a gas turbine engine, the centrifugal compressor having an impeller and a diffuser pipe assembly downstream thereof, the method comprising: separating a flow of air exiting the impeller in sub-flows of air, and feeding the sub-flows of air to diffuser pipes of the diffuser pipe assembly and directing the fed sub-flows through the diffuser pipes toward the combustor; and limiting a transfer of vibrations from at least one of the diffuser pipes to adjacent diffuser pipes by varying a natural vibration frequency of at least one of the diffuser pipes relative to the adjacent diffuser pipes by aerodynamically damping the at least one of the diffuser pipes to generate a natural vibration frequency offset between the at least one of the diffuser pipes and the adjacent diffuser pipes.

BRIEF DESCRIPTION OF THE DRAWINGS

Reference is now made to the accompanying figures in which.

DETAILED DESCRIPTION

Figure 1:
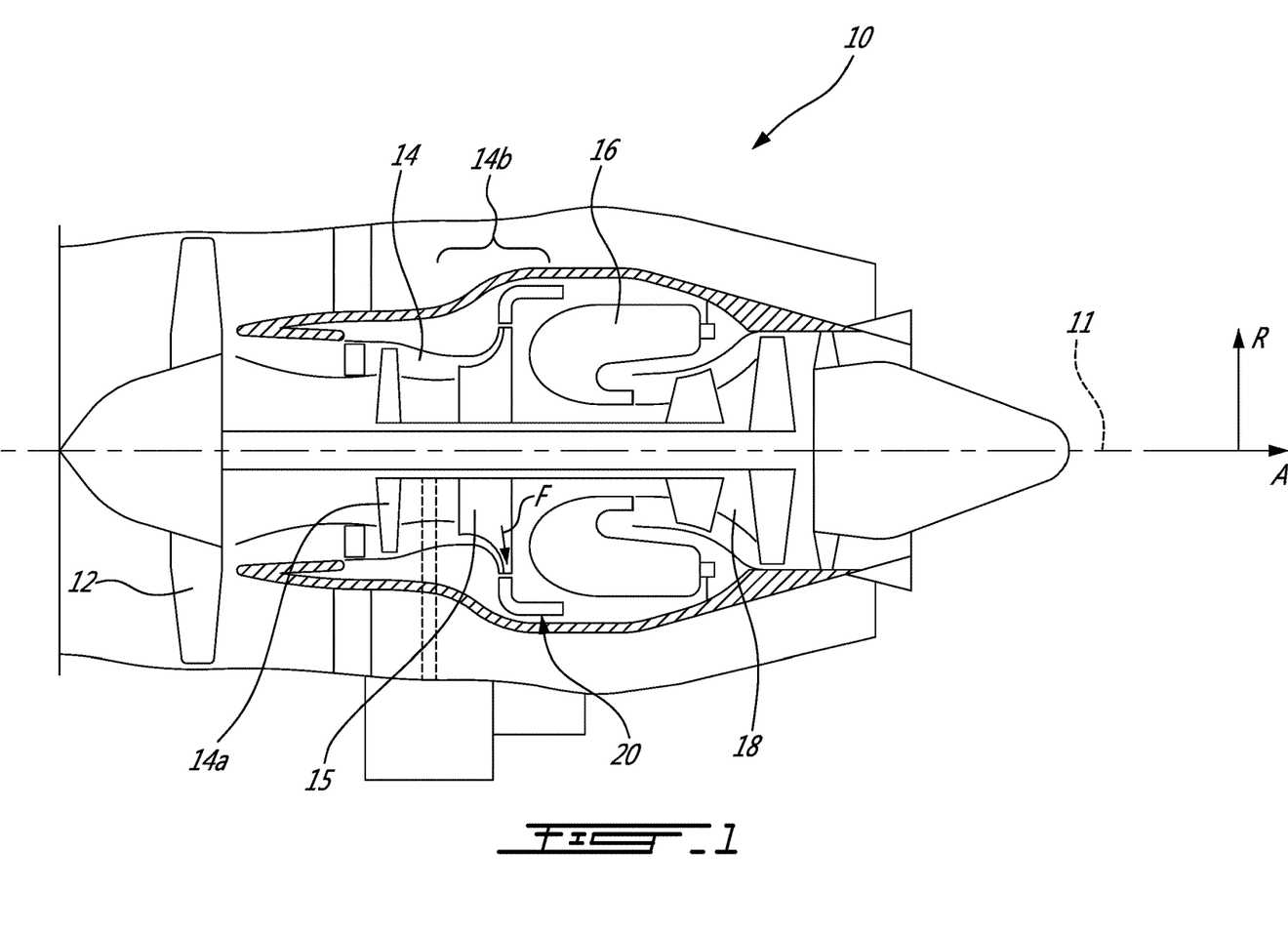
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine. The central axis 11 extends through the combustor 16 such that the combustor 16 circumferentially extends around the central axis 11.

Still referring to FIG. 1, the compressor section 14 includes a low pressure compressor 14a and a high pressure compressor 14b. The low pressure compressor 14a may be an axial compressor that includes a plurality of compressor stages each including a rotor and a stator. The high pressure compressor 14b is a centrifugal, or radial, compressor including an impeller 15 and a diffuser pipe assembly 20. The impeller 15 receives air that has been compressed by the low pressure compressor 14a along an axial direction A relative to the central axis 11. The impeller 15 includes a plurality of blades defining passages between two adjacent ones of the blades. The passages have each an inlet that is oriented substantially along the axial direction A and an outlet that is oriented substantially along a radial direction R relative to the central axis 11. The air from the low pressure compressor 14a, further to see its pressure increase via its circulation in the passages of the impeller 15, changes direction for being substantially axial to being substantially radial.

Figure 2:
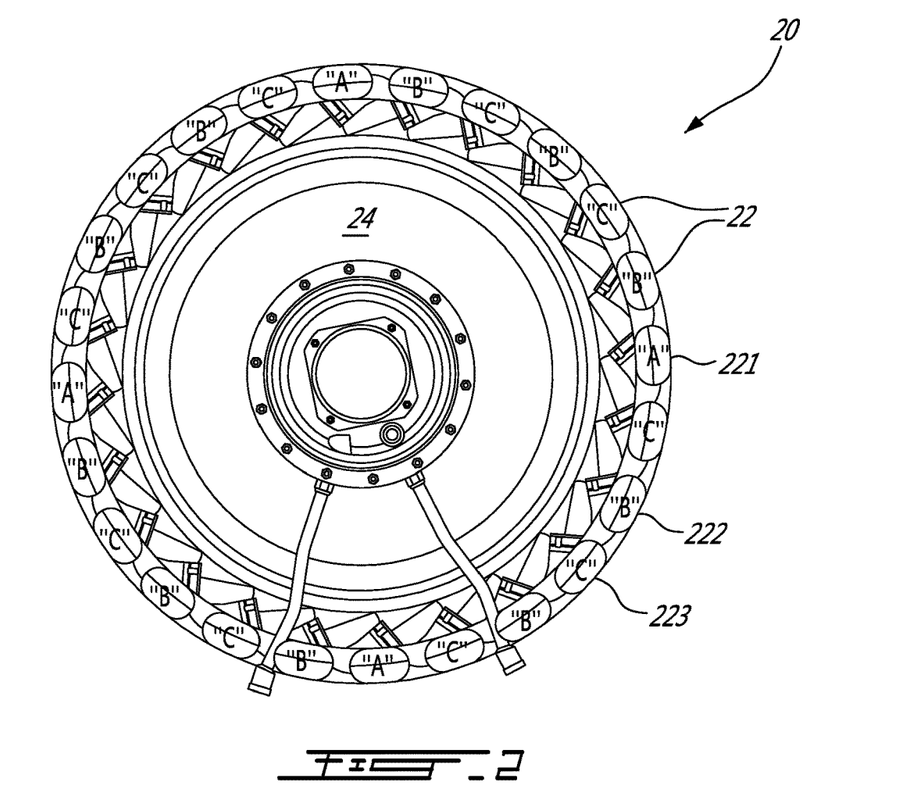
FIG. 2 is a front elevation view of a diffuser pipe assembly of the gas turbine of FIG. 1 in accordance with one embodiment.

Referring now to FIG. 2, the diffuser pipe assembly 20 of the centrifugal compressor 14b is used for redirecting the flow of compressed air that exits the impeller 15 of the high pressure compressor 14b from being substantially radial to being substantially axial relative to the central axis 11. The diffuser pipe assembly 20 includes diffuser pipes 22 and a diffuser case 24 on which the diffuser pipes 22 are secured. Each of the diffuser pipes 22 receives a portions of the flow, or a respective one of sub-flows, of compressed air from the impeller 15 and redirects it toward the combustor 16.

It has been observed that when a diffuser pipe 22 defined has a primary pipe vibrates at its natural vibration frequency due to excitation generated by the circulation of the compressed air in the diffuser pipe 22, it transfers vibrations to an adjacent diffuser pipe 22 through an air medium between the diffuser pipes 22 as well as through the diffuser case 24 to which the diffuser pipes 22 are secured. If the adjacent diffuser pipe 22 has a natural vibration frequency corresponding to that of the primary diffuser pipe 22, the adjacent diffuser pipe participates in the vibration of the primary pipe. When both the adjacent and primary diffuser pipes 22 vibrate at the same frequency, there is additional amplification of vibrations through the air medium and through the diffuser case 24 that is common to both the diffuser pipes 22 due to sympathetic vibrations.

To attenuate at least partially the above mentioned phenomenon, it might be advantageous to use different types of diffuser pipes 22 for a same diffuser pipe assembly 20 to mistune the natural vibration frequencies such that a natural vibration frequency of at least one of the diffuser pipes 22 is different from that of a remainder of the diffuser pipes 22 of the diffuser pipe assembly 20. This might avoid propagating and amplifying vibrations of the primary diffuser pipe 22.

In the embodiment shown in FIG. 2, the diffuser pipes 22 of the diffuser pipe assembly 20 are divided into a first (A), a second (B), and a third (C) subset of diffuser pipes 221, 222, 223. The diffuser pipes 221 of the first subset have each a first natural vibration frequency. The diffuser pipes 222 of the second subset have each a second natural vibration frequency different than the first natural vibration frequency. And, the diffuser pipes of the third subset 223 have each a third natural vibration frequency different than both of the first natural vibration frequency and the second natural vibration frequency. In a particular embodiment, a relative difference between the first, second, and third natural vibration frequencies is from 1% to 10%. In a particular embodiment, each of the subsets includes more than one of the diffuser pipes. In the embodiment shown, the diffuser pipes are divided between the first, the second, and the third subsets.

More specifically, the diffuser pipes 221 of the first subset have each a first set of natural vibration frequencies. The diffuser pipes 222 of the second subset have each a second set of natural vibration frequencies. And, the diffuser pipes of the third subset 223 have each a third set of natural vibration frequencies. Each of the first, second, and third sets of natural vibration frequencies includes one frequency that is closest to a vibration frequency of the gas turbine engine. These frequencies corresponds to the above mentioned first, second, and third natural vibration frequencies. At least the first, second, and third natural vibration frequencies are different from one another. In a particular embodiment, more than one or all frequencies of the first, second, and third sets of natural vibration frequencies are different from one another.

In the depicted embodiment, the diffuser pipes of the first, second, and third subsets 221, 222, 223 are disposed in a random manner around the central axis 11. Other configurations are contemplated without departing from the scope of the present disclosure. For instance, in a particular embodiment, the diffuser pipes of the first, second, and third subsets 221, 222, 223 may be disposed in alternation around the central axis 11 (A-B-C-A-B-C . . . ).

Figure 3:
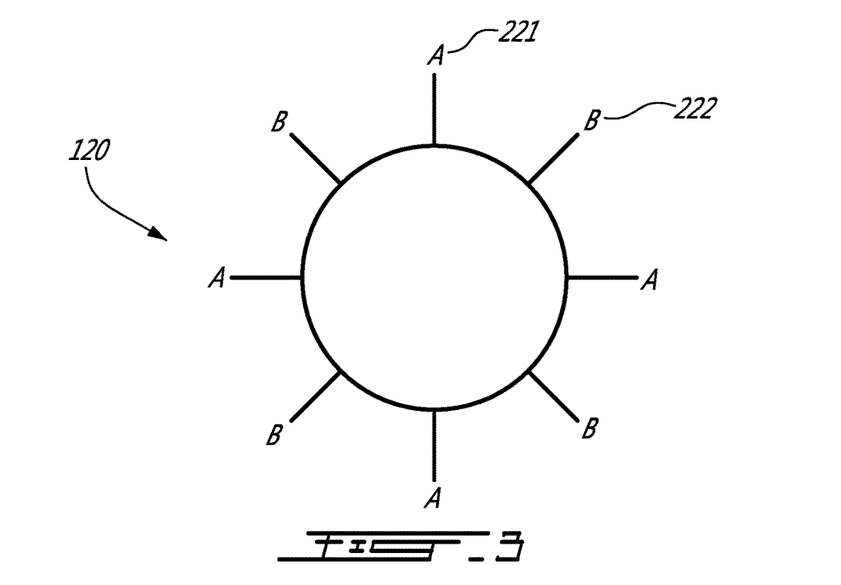
FIG. 3 is a schematic front elevation view of a diffuser pipe assembly of the gas turbine of FIG. 1 in accordance with another embodiment.

Referring now to FIG. 3, a diffuser pipe assembly in accordance with another embodiment is generally shown at 120. As illustrated, the diffuser pipes 22 may be divided into a first (A) and a second (B) subsets of diffuser pipes 22. The diffuser pipes of the first subset 221 have each a first natural vibration frequency and the diffuser pipes of the second subset 222 have each a second natural vibration frequency different than the first natural vibration frequency. In the embodiment shown, the diffuser pipes are divided between the first and the second subsets. In a particular embodiment, a relative difference between the first and second natural vibration frequencies is from 1% to 10%.

More specifically, the diffuser pipes of the first subset 221 have each a first set of natural vibration frequencies and the diffuser pipes of the second subset 222 have each a second set of natural vibration frequencies. Similarly to the embodiment of FIG. 3, each of the first and second sets of natural vibration frequencies includes one frequency that is closest to a vibration frequency of the gas turbine engine. These frequencies corresponds to the above mentioned first and second natural vibration frequencies. At least the first and second natural vibration frequencies are different from one another. In a particular embodiment, more than one or all frequencies of the first and second sets of natural vibration frequencies are different from one another.

In the depicted embodiment, the diffuser pipes of the first and second subsets 221, 222 are disposed in alternation around the central axis (i.e., A-B-A-B . . . ). Other configurations are contemplated without departing from the scope of the present disclosure. For instance, more than three subsets of diffuser pipes may be used without departing from the scope of the present disclosure. It is understood that a subset may include only one diffuser pipe. In a particular embodiment, the diffuser pipes includes a first subset and at least a second subset of diffuser pipes; the first subset having a natural vibration frequency different than a natural vibration frequency of the at least second subset of diffuser pipes.

In a particular embodiment, all of the diffuser pipes 22 of the diffuser pipe assembly 20 may have a single, common shape and at least one of the diffuser pipes 22 may be made of a material different than that of a remainder of the diffuser pipes 22 such that the natural vibration frequency of the at least one of the diffuser pipes 22 is different than that of the remainder of the diffuser pipes 22. The variation in the natural vibration frequencies may result from a difference between the Young's moduli, or stiffness, of the diffuser pipes 22.

Figure 4:
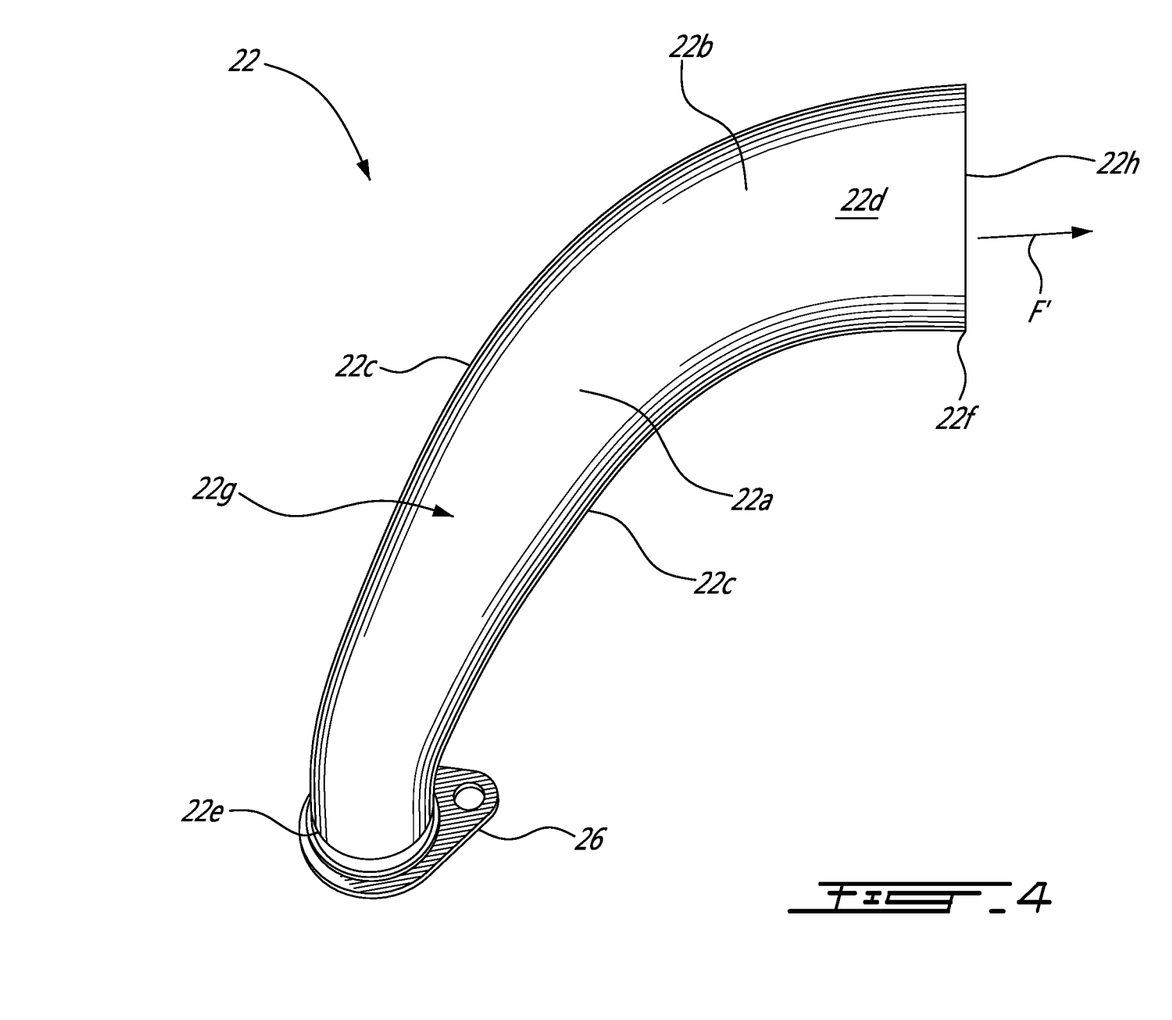
FIG. 4 is a three-dimensional view of a diffuser pipe of the diffuser pipe assembly in accordance with one embodiment.

Referring more particularly to FIG. 4, each of the diffuser pipes 22 includes a hollow pipe body 22a that may be made of two formed metal sheets that might be welded to each other or secured to each other via any suitable process. It is contemplated that the diffuser pipes 22 could be stamped, hydroformed, cast, 3D printed, or machined. In a particular embodiment, the metal sheets have a thickness of 0.035 inch. The hollow pipe body 22a defines two flat faces 22b each located on a respective opposed sides of the hollow pipe body 22a. The two flat faces 22b are connected together via opposed curved faces 22c.

The hollow pipe body 22a defines a diffuser conduit 22d that extends between an inlet end 22e and an outlet end 22f. The hollow pipe body 22a has a curvature 22g between the inlet end 22e and the outlet end 22f. In the embodiment shown, the inlet end 22e is welded to a ferrule 26, which connects the diffuser pipe 22 to the diffuser case 24 by bolting. It is contemplated that the diffuser pipe 22 could be connected to the diffuser case 24 by brazing as well. The outlet end 22f defines an edge 22h that might be secured to a ring as discussed herein below.

Figure 5:
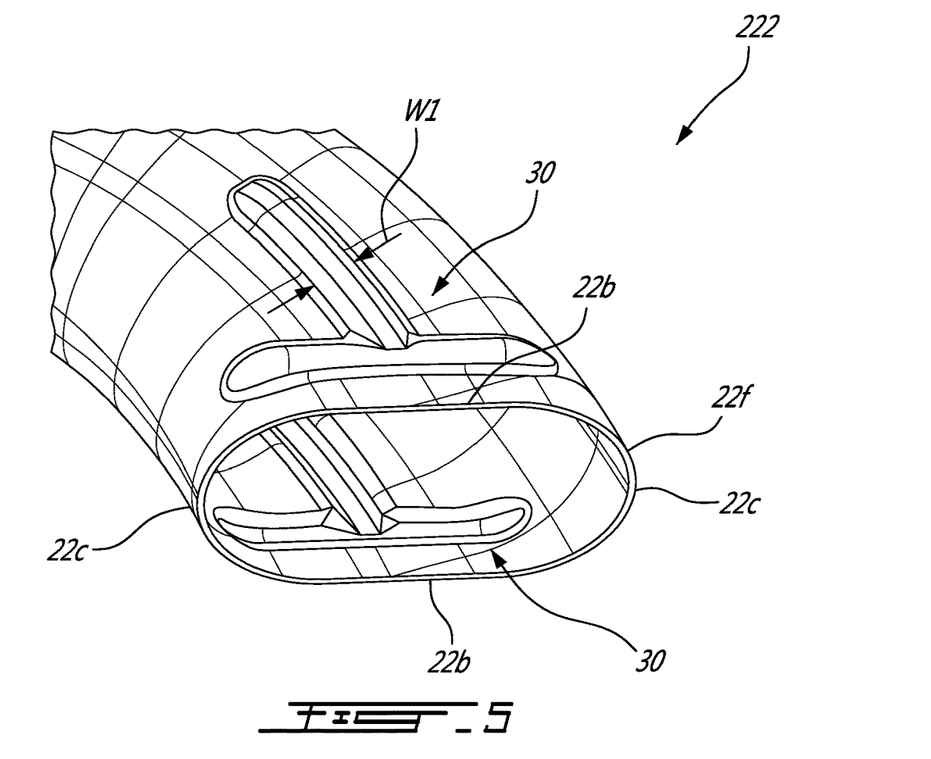
FIG. 5 is a three-dimensional view of a portion of a diffuser pipe in accordance with a particular embodiment.

Referring now to FIG. 5, a possible embodiment of a diffuser pipe is shown at 222. The diffuser pipe 222 is similar to the diffuser pipe 22 shown in FIG. 4, but includes at least one dimple 30 located proximate the outlet end 22f. In the embodiment shown, the diffuser pipe 222 includes two dimples 30 each located on a respective one of the flat faces 22b of the hollow pipe body 22a. The dimples 30 are used to vary a stiffness of the diffuser pipe 222 relative of a diffuser pipe lacking such dimples 30. In the embodiment shown, the dimples 30 have a T-shape. A width W1 of the dimples may be of from 0.01 inch to 0.5 inch.

FIGS. 6 to 12 show other shapes of dimples to be used with the diffuser pipes of the diffuser pipe assembly.

Figure 6:
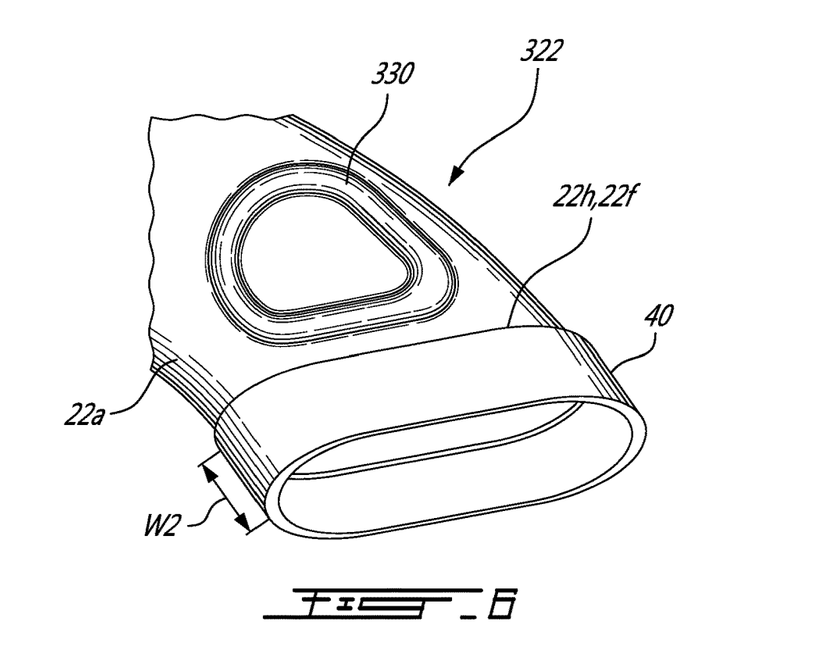
FIGS. 6 to 12 are schematics views of different shapes of dimples for a diffuser pipe of the diffuser pipe assembly in accordance with particular embodiments.

The diffuser pipe 322 of FIG. 6 has a dimple 330 having D-shape. In the embodiment shown, the diffuser pipe 322 includes a ring 40 secured to the edge 22h of the hollow pipe body 22a and at the outlet end 22f of the hollow pipe body 22a. The ring 40 circumferentially extends along a perimeter of the outlet end 22f. In particular embodiment, the natural vibration frequency of at least one of the diffuser pipes 322 may be varied by changing a stiffness of the ring 40 of the at least one of the diffuser pipes 22. The stiffness may be varied by using a material different than that of the rings 40 of the other diffuser pipes and/or by having a thickness of the ring 40 of the at least one of the diffuser pipes 322 different than that of the rings 40 of the other diffuser pipes 322 and/or by having a width W2 of the ring 40 of the at least one of the diffuser pipes 322 different than that of the other diffuser pipes 322.

Figure 7:
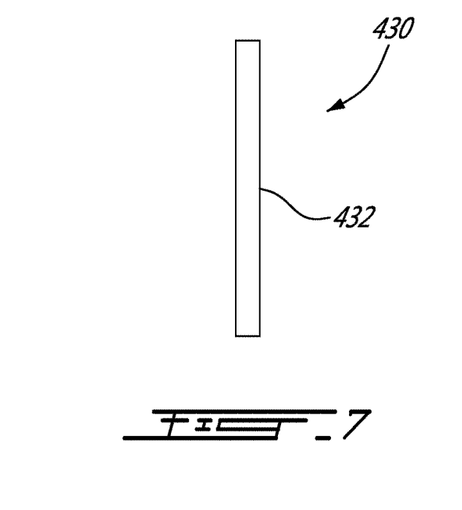
Figure 8:
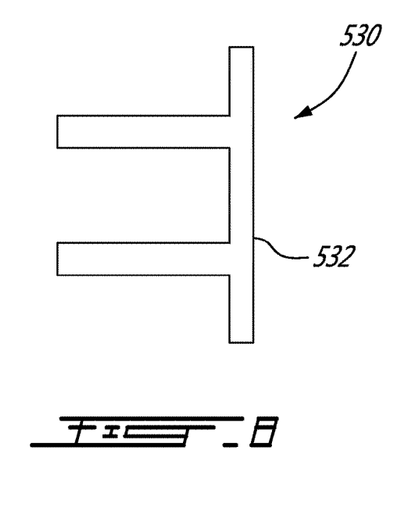
Figure 9:
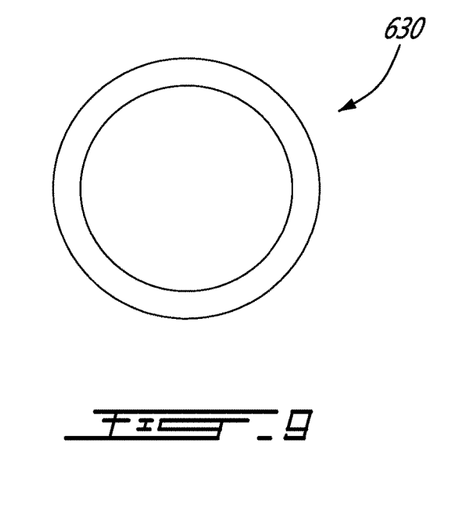
Figure 10:
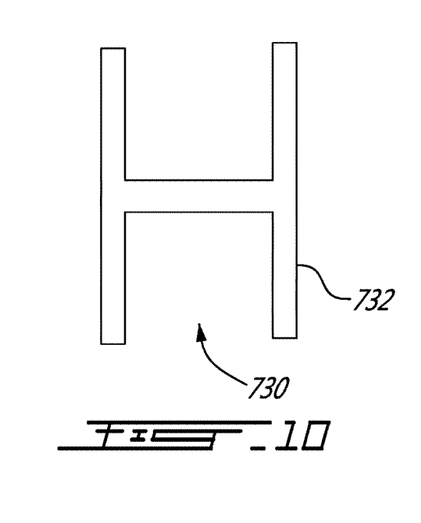
Figure 11:
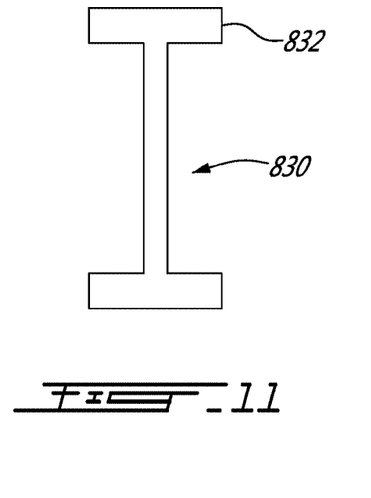
Figure 12:
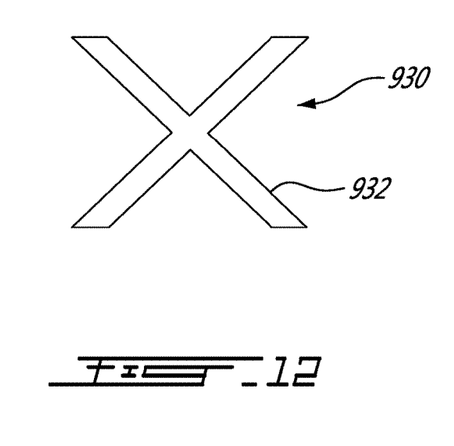

The dimple 430 of FIG. 7 is a straight line 432 and might be disposed parallel to the edge 22h. The dimple 530 of FIG. 8 is Pi-shaped and has a straight portion 532 that might be disposed parallel to the edge 22h. The dimple 630 of FIG. 9 is 0-shaped. The dimple 730 of is FIG. 10 is H-shaped and has a straight portion 732 that might be disposed parallel to the edge 22h. The dimple 830 of FIG. 11 is I-shaped and has a straight portion 832 that might be disposed parallel to the edge 22h. The dimple 930 of FIG. 12 is X-shaped. The X-shape dimple might be oriented to have a top of one of the V 932 forming the X parallel to the edge 22h. All the dimples shown on FIGS. 7 to 13 are schematics. Diffuser pipes 22 of the diffuser pipe assembly 20 may be provided with any combinations of the disclosed dimples.

Figure 13:
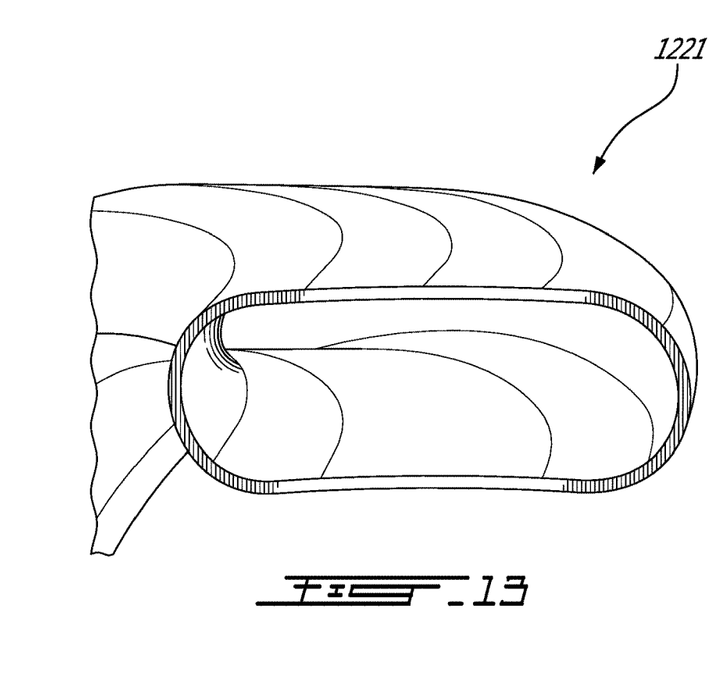
FIG. 13 is a three-dimensional view of a possible embodiment of diffuser pipe "A" of the diffuser pipe assembly of FIG. 3.
Figure 14:
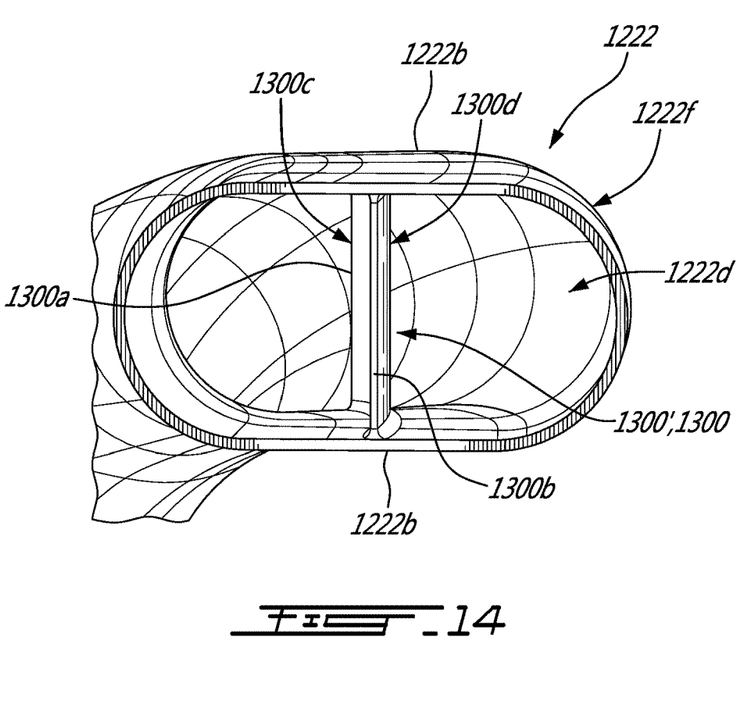
FIG. 14 is a three-dimensional view of diffuser pipe "B" of the diffuser pipe assembly of FIG. 3 in accordance with another embodiment.

Referring now to FIGS. 3 and 13-14, the diffuser pipe assembly 120 may include a combination of first diffuser pipes (A) 1221 and second diffuser pipes (B) 1222. In the depicted embodiment, the second diffuser pipes 1222 have aero-dampers 1300' which may be located within the diffuser conduits 1222d such that the second diffuser pipes 1222 have a natural vibration frequency different than a natural vibration frequency of at least the first diffuser pipes 1221. The first diffuser pipes 1221 may be free of aero dampers or may have aero dampers being different than the aero dampers of the second diffuser pipes 1222.

The diffuser pipe assembly 120 may include a plurality of the first and second diffuser pipes disposed in alternation (e.g., A-B-A-B) or in any other suitable order (e.g., A-A-B-B-A-A). One or more of third diffuser pipes may be used in combination with the first and second diffuser pipes 1221, 1222.

Herein, aero-dampers mean a device, structural feature, protrusions, recess, or any combination thereof that is able to change or alter a behavior of the flow of compressed air circulating through the diffuser pipes. The aero-dampers in combination with the flow circulating there around may alter the aero-damping of a diffuser pipe having such an aero-damper compared to another substantially identical diffuser pipes but lacking such the aero-damper, or having another kind of aero-dampers 1300'. Altering the aero-damping feature may change the frequency at which a given diffuser pipe enters in natural vibrations. In other words, the natural vibration frequency of a diffuser pipe with an aero-damper is different than the natural vibration frequency of the same diffuser pipe lacking the aero-damper. Stated otherwise, the aero-damper offsets the natural vibration frequency of a diffuser pipe including said aero-damper from the natural vibration frequency it would have but for the aero-damper.

Aero-Damping (Viscous) may be function of flow velocity, modifying the area might influence the velocity and therefore the aero damping. Maintaining constant area but changing different geometric profile might change the total surface area and friction forces to influence damping. Flow separation at the exit with different exit area/shape might further affect the damping as a result of pressure difference at the exit.

In the depicted embodiment, the aero-dampers 1300' are vanes 1300 located within the diffuser conduits 1222d. The vanes 1300 may have leading edges 1300a and trailing edge 1300b, pressure sides 1300c, and suction sides 1300d. Chord lengths are defined from the leading edges 1300a to the trailing edges 1300b. In a particular embodiment, a ratio of the chord lengths over lengths of the diffuser pipes taken from the inlet ends to the outlet ends ranges from 10 to 40.

In the embodiment shown, the vanes 1300 extend from one of opposed sides 1222b to the other. In other words, the vanes 1300 may be secured to the diffuse pipes at both of their extremities. Alternatively, the vanes 1300 may be cantilevered such that their tips is exposed to the flow of compressed air.

In the embodiment shown, the aero-dampers 1300' are located proximate the outlet ends 1222f of the diffuser pipes 1222. The trailing edges 1300b of the vanes 1300 may be aligned with the outlet ends 1222f. In other words, the trailing edges 1300b of the vanes 1300 may be contained within a plane also containing the outlet end 1222f of the diffuser pipe 1222.

In a particular embodiment, the vanes 1300 may define angles of attack relative to the flow of compressed air circulating within the diffuser pipes. The angles of attack may range from 5 to 25.

In a particular embodiment, each of the diffuser pipes of the diffuser pipe assembly have a vane within its diffuser conduit. The vane of at least one of the diffuser pipes may differ from the vanes of adjacent diffuser pipes by its angle of attack, its chord lengths, its aerodynamic profile, and any other suitable characteristics such as its thickness. A diffuser pipe may include more than one aero-damper. The diffuser pipe assembly may include diffuser pipes having aero-dampers and diffuser pipes being free of such dampers.

A diffuser pipe assembly may include diffuser pipes having any of the features described above with reference to FIGS. 1-14, such as, aero-dampers 1300', dimples 30, 330, 430, 530, 630, 730, 830, 930, and/or rings 40.

For operating the centrifugal compressor 14b of the gas turbine engine 10 the flow F (FIG. 1) of compressed air exiting the impeller 15 is separated in sub-flows F' (FIG. 4) of compressed air. The sub-flows F' are fed to the diffuser pipes 22 of the diffuser pipe assembly 20 and directed toward the combustor 16. A transfer of vibrations from at least one of the diffuser pipes to adjacent diffuser pipes is limited by varying aero-damping of at least one of the diffuser pipes relative to the adjacent diffuser pipes by aerodynamically damping the at least one of the diffuser pipes to generate a natural vibration frequency offset between the at least one of the diffuser pipes and the adjacent diffuser pipes In a particular embodiment, altering the aero-damping of the at least one of the diffuser pipes 1222 relative to the other diffuser pipes 1221 allows to limit the transfer of resonance to the adjacent pipes and allows to limit amplification of the vibrations.

In a particular embodiment, the mistuning of the diffuser pipes is achieved by having the diffuser pipes differing by their geometries, by their thicknesses of sheet metals from which they are manufactured, by materials from which they are manufactured, by variations in dimples defined on them, and/or by inclusion of aero-dampers within them. Stiffeners may also be used; the mistuning being achieved by having at least one diffuser pipe having a stiffener different than that of the others. Alternatively, only one of the diffuser pipes has a stiffener and/or a dimple.

In a particular embodiment, when the first diffuser pipe 1221 resonates due to engine order/flow related excitation, the second diffuser pipe 1222 will not respond due to different aero-damping designed by flow changing feature within the pipe.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A diffuser pipe assembly for a centrifugal compressor of a gas turbine engine defining a central axis extending longitudinally through the diffuser pipe assembly, the diffuser pipe assembly comprising: a plurality of diffuser pipes circumferentially distributed around the central axis and configured for diffusing a flow of compressed air received from an impeller, the diffuser pipes having a diffuser conduit for directing the flow of compressed air, the diffuser conduit curving between an inlet end and an outlet end along a conduit axis, the diffuser conduit having a baseline surface, a first subset of the diffuser pipes having aero-dampers, the aero-dampers including vanes protruding from the baseline surfaces of their diffuser conduits such that the diffuser pipes of the first subset have a natural vibration frequency different than a natural vibration frequency of at least a second subset of the diffuser pipes.

2. The diffuser pipe assembly of claim 1, wherein the vanes are located within the diffuser conduits of the diffusers of the first subset.

3. The diffuser pipe assembly of claim 2, wherein each of the vanes extends from one of opposed sides of a respective one of the diffuser pipes of the first subset to the other of the opposed sides.

4. The diffuser pipe assembly of claim 1, wherein the aero-dampers are located proximate the outlet ends of the diffuser pipes of the first subset.

5. The diffuser pipe assembly of claim 1, wherein the vanes have leading edges and trailing edges, the trailing edges aligned with the outlet ends of the diffuser pipes of the first subset.

6. The diffuser pipe assembly of claim 1, wherein the diffuser pipes of the at least second subset are free of aero dampers.

7. The diffuser pipe assembly of claim 1, wherein the vanes define an angle of attack relative to the flow of compressed air circulating within the diffuser conduits of the diffuser pipes of the first subset.

8. The diffuser pipe assembly of claim 7, wherein the angle of attack ranges from 5 to 25 degrees.

9. The diffuser pipe assembly of claim 1, wherein the vanes have leading edges and trailing edges, chord lengths extending from the leading edges to the trailing edges, a ratio of the chord lengths over lengths of the diffuser pipes taken from the inlet ends to the outlet ends ranging from 10 to 40.

10. The diffuser pipe assembly of claim 1, wherein the aero-dampers are first aero-dampers, diffuser pipes of the at least second subset having second aero-dampers different than the first aero-dampers.

11. The diffuser pipe assembly of claim 10, wherein the first aero-dampers are first vanes and the second aero-dampers are second vanes, the first vanes having different angles of attack, different chord lengths, and/or different thickness than the second vanes.

12. A gas turbine engine comprising a centrifugal compressor rotatable about a central axis and a combustor downstream of the centrifugal compressor relative to a flow of compressed air exiting the centrifugal compressor, the centrifugal compressor including an impeller and a diffuser pipe assembly downstream of the impeller, the diffuser pipe assembly including diffuser pipes, the diffuser pipes having diffuser conduits for circulating the flow of compressed air, the diffuser pipe assembly configured for redirecting the flow of compressed air from a radial direction to an axial direction relative to the central axis, the diffuser pipe assembly including diffuser pipes circumferentially distributed around the central axis, the diffuser conduits being fluidly connected to the impeller and to the combustor, and a first subset of the diffuser pipes having aero-dampers, the aero-dampers including vanes located within the diffuser conduits such that the diffuser pipes of the first subset have a natural vibration frequency different than a natural vibration frequency of at least a second subset of the diffuser pipes.

13. The gas turbine engine of claim 12, wherein the vanes are located within the diffuser conduits of the diffusers of the first subset.

14. The gas turbine engine of claim 12, wherein the vanes have leading edges and trailing edges, the trailing edges aligned with the outlet ends of the diffuser pipes of the first subset.

15. The gas turbine engine of claim 12, wherein the diffuser pipes of the at least second subset are free of aero dampers.

16. The gas turbine engine of claim 12, wherein the vanes define an angle of attack relative to the flow of compressed air circulating within the diffuser conduits of the diffuser pipes of the first subset.

17. The gas turbine engine of claim 16, wherein the angle of attack ranges from 5 to 25 degrees.

18. The gas turbine engine of claim 12, wherein the aero-dampers are first aero-dampers, diffuser pipes of the at least second subset having second aero-dampers different than the first aero-dampers.

19. The gas turbine engine of claim 18, wherein the first aero-dampers are first vanes and the second aero-dampers are second vanes, the first vanes having different angles of attack, different chord lengths, and/or different thickness than the second vanes.

20. A method of operating a centrifugal compressor of a gas turbine engine, the centrifugal compressor having an impeller and a diffuser pipe assembly downstream thereof, the method comprising:

separating a flow of air exiting the impeller into sub-flows of air, and feeding the sub-flows of air to diffuser pipes of the diffuser pipe assembly and directing the fed sub-flows through the diffuser pipes toward a combustor of the gas turbine engine; and limiting a transfer of vibrations from at least one of the diffuser pipes to adjacent diffuser pipes by varying a natural vibration frequency of the at least one of the diffuser pipes relative to the adjacent diffuser pipes by aerodynamically damping, with at least one vane extending into the at least one of the diffuser pipes, the at least one of the diffuser pipes to generate a natural vibration frequency offset between the at least one of the diffuser pipes and the adjacent diffuser pipes.

\* \* \* \* \*